(12) United States Patent
Judge

(10) Patent No.: X6522
(45) Date of Patent: Apr. 27, 1831

(54) TIMBER HEWING,DUBBING & DRESSING FOR SHIPS

(76) Inventor: John Judge

John Judge, Letters patent

The schedule referred to in these Letters patent and making part of the same, containing a description in the words of the said John Judge himself of his improvement in the machine for hewing, dubbing or dressing ship timber Specification The log, timber, plank, or knee &c. are fastened to the carriage A A by means of the screws B B and advanced to the wheel C by means of a rack and pinion as applied to a saw mill carriage or by an endless chain passing over ratchet or chain wheels, if by the chain two sets of carriages may be used which will keep the cutter wheel constantly employed. The cutter wheels may be made to suit any thickness of timber, by making them advance towards or recede from each other by means of a screw on the shaft or a groove and key in the same as wheels are generally hung on round shafts In this machine what I claim as my invention is the application of cutters on the periphery of wheels to the hewing dubbing or dressing of ship timber, knees, plank &c. &a with the manner of fastening the timber &c to the carriages and also ~~the~~ manner of adjusting the wheels to

United States Patent

Patent No.: X6522 the different Checknaffes of Ignition &c

John Judge

Witnesses, William P Elliot
Warner Ruggles

Rec'd & Recorded anew. March 10th 1857
Ens. U.S.